(12) United States Patent
Reich

(10) Patent No.: US 9,020,762 B2
(45) Date of Patent: Apr. 28, 2015

(54) METHOD FOR PROVIDING ROAD DATA IN A MOTOR VEHICLE, AND GROUND-BASED DEVICE

(75) Inventor: Andreas Reich, Buxheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/131,243

(22) PCT Filed: Jun. 23, 2012

(86) PCT No.: PCT/EP2012/002660
§ 371 (c)(1),
(2), (4) Date: Jan. 7, 2014

(87) PCT Pub. No.: WO2013/004353
PCT Pub. Date: Jan. 10, 2013

(65) Prior Publication Data
US 2014/0172300 A1    Jun. 19, 2014

(30) Foreign Application Priority Data

Jul. 7, 2011  (DE) .......................... 10 2011 106 828

(51) Int. Cl.
| | | |
|---|---|---|
| G01C 21/26 | (2006.01) | |
| G01C 21/32 | (2006.01) | |
| G08G 1/0967 | (2006.01) | |
| G08G 1/14 | (2006.01) | |
| G08G 1/16 | (2006.01) | |

(52) U.S. Cl.
CPC ............... *G01C 21/26* (2013.01); *G01C 21/32* (2013.01); *G08G 1/096716* (2013.01); *G08G 1/096758* (2013.01); *G08G 1/096783* (2013.01); *G08G 1/14* (2013.01); *G08G 1/162* (2013.01); *G08G 1/163* (2013.01)

(58) Field of Classification Search
CPC ........................................................ G01C 21/26
USPC .......... 701/537, 117, 119, 414, 423, 450, 484
See application file for complete search history.

(56) References Cited

U.S. PATENT DOCUMENTS

| | | | |
|---|---|---|---|
| 7,460,948 B2 * | 12/2008 | Van Buer et al. ............. | 701/117 |
| 7,706,963 B2 * | 4/2010 | Parikh et al. .................. | 701/117 |
| 7,729,708 B2 * | 6/2010 | Jung et al. .................. | 455/456.3 |

(Continued)

FOREIGN PATENT DOCUMENTS

| | | |
|---|---|---|
| DE | 102004032346 | 1/2006 |
| DE | 69925085 | 2/2006 |

(Continued)

OTHER PUBLICATIONS

English language International Search Report for PCT/EP2012/002660, mailed on Oct. 25, 2012, 3 pages.

(Continued)

*Primary Examiner* — Mary Cheung
*Assistant Examiner* — Michael Berns
(74) *Attorney, Agent, or Firm* — Staas & Halsey LLP

(57) ABSTRACT

Ground-based devices are provided which each have a transceiver apparatus and a data memory. Route data are stored in the data memory. This route data can be transmitted in a wireless fashion from the ground-based device to motor vehicles so that information relating to such a route is made available in the motor vehicles which are located outside the sensing range of a sensing apparatus of the motor vehicle.

18 Claims, 1 Drawing Sheet

(56) References Cited

U.S. PATENT DOCUMENTS

| | | | | |
|---|---|---|---|---|
| 7,772,996 | B2* | 8/2010 | Burns | 340/991 |
| 8,427,341 | B2* | 4/2013 | Yulevich | 340/905 |
| 2007/0213922 | A1* | 9/2007 | Van Buer et al. | 701/117 |
| 2009/0027176 | A1 | 1/2009 | Yulevich | |
| 2011/0095908 | A1 | 4/2011 | Nadeem et al. | |
| 2011/0211301 | A1* | 9/2011 | Take et al. | 361/679.01 |

FOREIGN PATENT DOCUMENTS

| | | |
|---|---|---|
| DE | 102005039893 | 3/2006 |
| DE | 102006057741 | 9/2007 |
| DE | 102007027297 | 12/2008 |
| DE | 102007042793 | 3/2009 |
| DE | 102008033296 | 3/2009 |
| DE | 2136346 | 12/2009 |
| DE | 102008025707 | 12/2009 |
| DE | 102008034594 | 1/2010 |
| DE | 102008034606 | 1/2010 |
| DE | 102008059278 | 6/2010 |
| DE | 102011106828.0 | 7/2011 |
| EP | 1150266 | 10/2001 |
| WO | PCT/EP2012/002660 | 6/2012 |

OTHER PUBLICATIONS

German Office Action for German Priority Patent Application No. 10 2011 106 828.0, issued Nov. 30, 2011, 8 pages.

German Office Action for German Priority Patent Application No. 10 2011 106 828.0, issued Feb. 28, 2013, 8 pages.

English Language International Preliminary Report on Patentability for PCT/EP2012/002660, mailed Jan. 9, 2014, 6 pages.

* cited by examiner

METHOD FOR PROVIDING ROAD DATA IN A MOTOR VEHICLE, AND GROUND-BASED DEVICE

CROSS REFERENCE TO RELATED APPLICATIONS

This application is based on and hereby claims priority to International Application No. PCT/EP2012/002660 filed on Jun. 23, 2012 and German Application No. 10 2011 106 828.0 filed on Jul. 7, 2011, the contents of which are hereby incorporated by reference.

BACKGROUND

The invention relates to a method for providing route data, describing a route for a motor vehicle. The invention also relates to a ground-based device.

It is known that a motor vehicle itself senses its surroundings using cameras, ultrasonic sensors, etc., and that a representation of the surroundings is then provided to the vehicle driver in the motor vehicle. This is known, for example, from DE 10 2008 034 594 A1 and from DE 10 2008 034 606 A1. It is disadvantageous here that such parts of the route which are located outside the field of vision or measuring range of the vehicle cannot be sensed in the motor vehicle.

DE 10 2007 042 793 A1 relates to a method for providing driving operating data, in which a network is provided for wireless exchange of driving operating data between vehicles. A motor vehicle determines absolute driving operating data and this absolute driving operating data is transmitted from the motor vehicle to another motor vehicle.

Google® and other companies have in the past few years produced complete recordings of the roads of some towns in Germany and in other countries. This data is available via the Internet. This data is stored centrally at the companies. A motor vehicle could theoretically also access this data. However, a disadvantage here is that the recorded images reflect random situations and are not necessarily suitable for assisting a vehicle driver or an automatic vehicle guidance system in guiding the vehicle.

There are many situations in which it would be desirable if information relating to route areas which were not located in the current field of vision of the driver of the vehicle or within the sensing range of the sensors of the vehicle were available in a motor vehicle, specifically as a function of whether or not other motor vehicles can sense these areas. This applies, in particular, also in the private or semi-private spheres—for example, anyone wishing to reverse into the entry road of a house or wishing to allow a parking aid to carry out such a reversing maneuver might require information about the entry road of the house; in a multistorey car park there are often excessively narrow points, and in such a context it would be desirable to have prior knowledge about narrow points; and this also applies when traveling between narrow alleyways or streets with poor visibility.

EP 2 136 346 A2 describes a parking system for navigating a vehicle which is looking for a parking space to a free parking space in which information about available free parking spaces is requested from other vehicles in the traffic, which vehicles then directly transmit this information to the vehicle which is looking for a parking space, or transmit it indirectly to the vehicle which is looking for a parking space via a control center. In this context, the control center can first collect the information from one or more vehicles looking for a parking space and prepare this information for the vehicles looking for a parking space and subsequently transmit it.

DE 10 2004 032 346 A1 describes a vehicle guiding system for directing vehicles to free parking spaces in multistorey car parks. In this context, information about the free parking spaces is detected, for example by contact loops, and the information as to whether parking spaces are occupied or free is transmitted to a control apparatus. The control apparatus is connected to a transmitting apparatus which transmits the information about the free parking spaces to an output unit in a vehicle.

EP 1 150 266 A2 describes a system for collecting and distributing road surface information. The road surface information is transmitted here from vehicles, for example in the form of friction coefficients of a road or road section being traveled on at that particular moment. The friction coefficient of the road being traveled on at that particular moment is then transmitted from a respective vehicle and the position information of the respective road is transmitted to a "host computer", for example via the Internet. Said "host computer" collects the information about the friction coefficients of respective associated roads or road sections and transmits this information in turn to vehicles which are about to travel on the corresponding road section. The information is then used, for example, as input parameters for controlling the ABS.

DE 10 2008 059 278 A1 describes a method for updating data of a navigation system in which updated data from local data transmission stations is transmitted to the data memory of the navigation system and stored. This data is then transmitted to a central service provider which can in turn pass this data on to all its users.

SUMMARY

One possible object is to provide a method for providing route data, describing a route for a motor vehicle, in such a motor vehicle, by which method previously unavailable information is made available to the driver of the vehicle or to an automatic vehicle guidance system.

The inventor proposes a method, and a ground-based device. In the proposed method, route data is therefore stored in a positionally fixed apparatus which is located in or on the route or in or on an entry road to the vehicle and which has a transceiver apparatus and a data memory, and said route data is transmitted in a wireless fashion from the positionally fixed apparatus to the motor vehicle.

The object is based on the realization that decentralized provision of the route data is substantially more flexible in order to react to changes in the route data. Furthermore, private individuals or business people who wish to make route data available to themselves and to others can do this in a comparatively uncomplicated way by simply providing the positionally fixed apparatus.

In one preferred embodiment, the positionally fixed apparatus is located at maximum 100 m, preferably at maximum 50 m from the route which is described by the route data stored in the data memory of said device. Therefore, the route data made available here is done so over a particularly small area, at a location where it is directly required.

In one preferred embodiment, the route data is also transmitted over a distance of at maximum 200 m, preferably of at maximum 50 m, directly from the transceiver apparatus to the motor vehicle. It is therefore possible, but not necessary, for the route data to be transmitted via a central network apparatus, for example a mobile radio network. Instead, techniques for transmitting the telecommunications or messages or information can be used in which it is possible to dispense with a control center. For example, the transmission of the route data can take place via radio (for example BLUE-TOOTH™), infrared or ultrasonic sound.

In one further preferred embodiment, data relating to the position of the positionally fixed apparatus is available in the motor vehicle, for example the positions of a plurality of positionally fixed apparatuses are available in a navigation device of the motor vehicle. The approaching of the motor vehicle to the positionally fixed apparatus is sensed (according to a predetermined criterion), for example using a positioning sensor which uses, for example, the Global Positioning System (GPS)—simply the position of the motor vehicle itself has to be ascertained and compared with that of the positionally fixed apparatus. When such an approach is sensed, a request is transmitted from the motor vehicle to the positionally fixed apparatus in order to obtain the route data. This preferred embodiment has the advantage that the positionally fixed apparatus does not have to emit signals itself for the motor vehicle to have the information that the positionally fixed apparatus exists at all.

As an alternative to the specified preferred embodiment, as a result of an operator control element in the motor vehicle being activated, a request can be transmitted from the motor vehicle to a positionally fixed apparatus in order to obtain the route data. In this case, the driver of the vehicle detects, for example on the basis of a self-explanatory symbol, or one which is well known to said driver, on a ground-based device, such as for example a building or a column, that route data is available here, and it interrogates this data actively.

According to the inventors proposals, when traveling on the route the motor vehicle itself acquires route data and transmits it to the positionally fixed apparatus. In this way, up-to-date route data is always available in the positionally fixed apparatus and can, for example, be transmitted to a vehicle arriving later.

The configuration here is even such that the positionally fixed apparatus compares the transmitted route data with the previously stored route data and updates the route data according to a predetermined criterion in order subsequently to transmit the updated route data to a motor vehicle. The predetermined criterion includes the fact that a property of the route which is described in the originally stored route data and has possibly changed is checked in terms of the permanence of the change in said data—if, for example, the ground covering of the route has changed (for example in the case of an entry road to a private house) of if new parking spaces are delineated on a public road, this new property is "learnt" by the positionally fixed apparatus if, for example, the corresponding new route data is transmitted for a minimum number of times. If a minimum number of times which is different from one is selected, it is ensured to an increased degree that short-term changes in the surroundings of the vehicle on the route are not communicated straight away to a motor vehicle the next time. If, for example, a new tree is planted in the vicinity of the route, this change has to be sensed permanently. If, for example, there are merely a number of boxes in the garage and they are cleared away again later, the information about these boxes is not essential and should not be included in the route data transmitted to the motor vehicle.

In one preferred embodiment, the positionally fixed apparatus is itself coupled to sensors which acquire measurement data. The positionally fixed apparatus compares the measurement data, which its sensors have acquired, with the previously stored route data and updates the route data according to a predetermined criterion in order subsequently to transmit the updated route data to a motor vehicle. Here, the surroundings are "learnt" automatically by the positionally fixed apparatus and are therefore independent of how often a motor vehicle interrogates corresponding data and transmits it.

In one preferred embodiment, the route data describes contours of roadway boundaries and/or obstacles (on or above the roadway). In this way, it is, in particular, possible for an automatic vehicle guidance system, such as for example a parking aid, to use the route data at least in a supportive fashion in order to guide the vehicle.

The proposed ground-based device comprises a data memory in which route data relating to a route in the surroundings is stored; said device comprises a transceiver apparatus which is configured to transmit the stored route data (to a requesting motor vehicle) in response to a request. The execution of the proposed method is made possible by the ground-based device. The ground-based device may be an entire building, wherein the data memory and the transceiver apparatus can then be provided at any desired location in the building. The ground-based device may alternatively also be a column, wall or the like which is specifically constructed for the purpose of storing the route data and which additionally can have the function of serving as a support for advertising (advertising column, hoarding, bus stop or the like). The device can also be provided by an object which provides a different function such as, for example, a bench, a trash can, a clock, etc., wherein all that is then necessary is to integrate the data memory and the transceiver apparatus into this object.

The ground-based device comprises a data-processing apparatus which is configured to compare the stored route data with other data and, if appropriate, modify said data on the basis of the comparison. As a result, the method according to the two embodiments described above is made possible. In one of the embodiments, the positionally fixed apparatus should additionally comprise sensors, for example a camera or an ultrasonic sensor, for sensing the surroundings.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
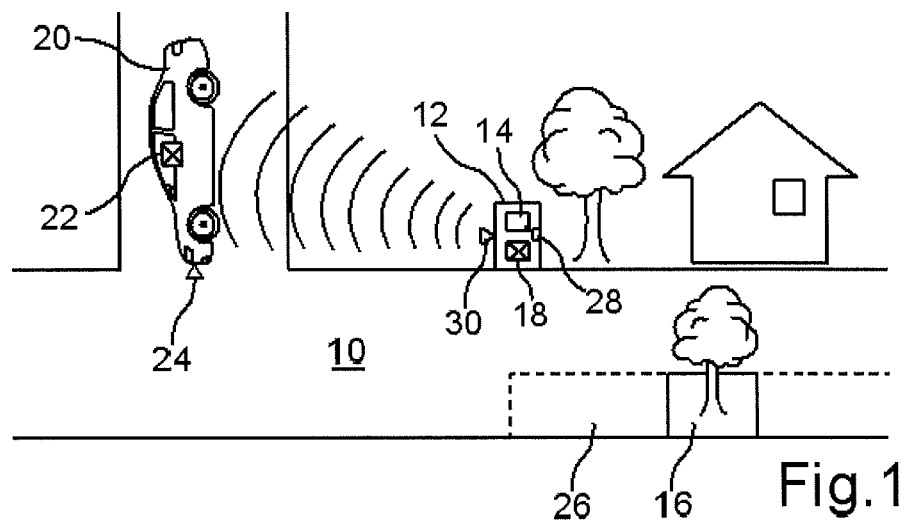
FIG. 1 illustrates a situation in which a proposed ground-based device according to one embodiment transmits to a motor vehicle route data relating to a route which is located outside the sensing range of the motor vehicle.

Reference will now be made in detail to the preferred embodiments of the present invention, examples of which are illustrated in the accompanying drawings, wherein like reference numerals refer to like elements throughout.

In the present case, there is a route 10 in the form of a road on which motor vehicles can travel. Located on the route is a column 12 as a ground-based device in which a memory 14 is arranged, wherein data describing the route 10 are stored in the memory 14. For example, it is apparent on the basis of the data that the roadway of the road 10 is constricted at a location because of the projecting area 16 in which a tree is planted.

In the column 12 there is also provided a transceiver apparatus 18, which transceiver apparatus 18 can exchange data with corresponding transceiver apparatuses of motor vehicles via a BLUETOOTH™ interface, that is to say by radio (wirelessly). In the present case, the data stored in the memory is transmitted to a motor vehicle 20 which has a transceiver apparatus 22. The motor vehicle 20 also has a camera 24 for sensing the roadway in front of the motor vehicle 20; in the present case the roadway 10 is, however, not located in the sensing range of this camera 24. As a result of the transmission of the route data from the memory 14 from the column 12 to the motor vehicle 20, information about the route outside the sensing range is now available in the motor vehicle 20, and the motor vehicle can therefore be steered predictively. For example, in view of the projecting area 16 with the tree, a steering deflection when driving around the bend can be somewhat smaller than would otherwise be the case.

Figure 2:
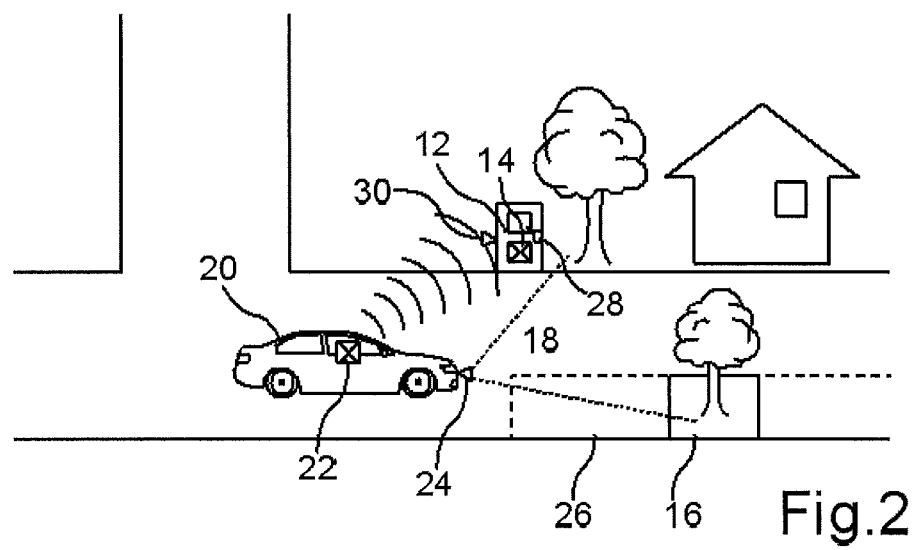
FIG. 2 illustrates the situation in which the motor vehicle now senses the route itself and transmits information back to the ground-based device.

In the situation as shown in FIG. 2, the motor vehicle 20 has already traveled around the bend and then senses with the camera 24 the contours of a parking space 26 which has not yet been described by the transmitted data 14; in the example the parking space 26 is assumed to have been delineated shortly before. The motor vehicle 20 drives to the parking space 26 and therefore detects that given knowledge of the parking space 26 the steering deflection would be somewhat smaller. By using the camera 24, an image of the situation is captured and either the image itself or the result of an evaluation of this image is transmitted as route data to the column 12, given a reversal of the previous communication path. In the column 12, an evaluation apparatus 28 can then compare the route data now transmitted with the route data which was stored in the memory 14 and transmitted previously to the motor vehicle 20. The comparison can reveal here that the parking space 26 has been added, and since the lines are permanently delineated, the previous route data 14 can be modified or added to or replaced so that the new route data now also describes the parking space 26.

If, instead of the parking space 26, only one other motor vehicle were parked without a parking space being indicated, the evaluation apparatus 28 would possibly have merely temporarily stored relevant information without changing the route data; only if a multiplicity of motor vehicles had transmitted corresponding information about a parked vehicle would the parked vehicle have been permanently integrated into the route data which is stored in the memory 14 and transmitted to motor vehicles.

As a result of the column 12, route data is made available in a decentralized fashion, specifically locally where the route 10 is also located, wherein the transmission range is somewhat larger so that vehicles which cannot sense the route 10 at that particular time can obtain corresponding information. On the basis of FIG. 2 it has been stated that the provision of the route data can include continuous learning of new driving situations.

In the present case, the column 12 can itself be equipped with a camera 30 by which it can sense its surroundings. A new driving situation can then also be learnt by the column 12 without the transmission of data from a motor vehicle 20 to the column 12. Both types of learning can also be combined with one another.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* V. *DIRECTV,* 69 USPQ2d 1865 (Fed. Cir. 2004).

The invention claimed is:

1. A method for providing route data to motor vehicles, describing a route for the motor vehicles, comprising:
    storing route data in a positionally fixed apparatus which has a transceiver apparatus and a data memory, the positionally fixed apparatus being located in or on the route or an entry road to the route;
    acquiring route data when traveling on the route, the route data being acquired by a first motor vehicle and indicative of an object;
    transmitting the route data from the first motor vehicle to the positionally fixed apparatus;
    comparing, at the positionally fixed apparatus, the route data transmitted from the first motor vehicle with the route data stored in the positionally fixed apparatus;
    updating the route data stored in the positionally fixed apparatus, according to a predetermined criterion representing a permanence of a change in a physical property of the route described in the route data stored in the positionally fixed apparatus, the route being updated if route data for the same object has been acquired at least a predetermined number of times; and
    after updating the route data, transmitting the route data to a second motor vehicle in a wireless fashion from the positionally fixed apparatus.

2. The method as claimed in claim 1, wherein
    the positionally fixed apparatus is located 100 m or less from the route described by the route data stored in the positionally fixed apparatus.

3. The method as claimed in claim 1, wherein
    the positionally fixed apparatus is located 50 m or less from the route described by the route data stored in the positionally fixed apparatus.

4. The method as claimed in claim 1, wherein
    the route data is transmitted over a distance of 200 m or less directly from the transceiver apparatus to the second motor vehicle.

5. The method as claimed in claim 4, wherein
    the second motor vehicle has a vehicle route sensor having a sensor range, and
    the second motor vehicle receives the route data from the transceiver apparatus before the second motor vehicle is within the sensor range of the route.

6. The method as claimed in claim 1, wherein
    the route data is transmitted over a distance of 50 m or less directly from the transceiver apparatus to the second motor vehicle.

7. The method as claimed in claim 1, wherein
    data relating to a positional location of the positionally fixed apparatus is available in the second motor vehicle, and
    when the second motor vehicle approaches the positionally fixed apparatus, a request is transmitted from the second motor vehicle to the positionally fixed apparatus in order to obtain the route data.

8. The method as claimed in claim 7, wherein
    the request is automatically transmitted from the second motor vehicle to the positionally fixed apparatus.

9. The method as claimed in claim 1, wherein
    as a result of an operator control element in the second motor vehicle being activated, a request is transmitted from the second motor vehicle to the positionally fixed apparatus in order to obtain the route data.

10. The method as claimed in claim 9, wherein
    an operator of the second motor vehicle receives a notification regarding availability of the route data, and the operator control element is activated in response to the notification.

11. The method as claimed in claim 1, wherein
the positionally fixed apparatus is coupled to sensors which acquire measurement data, and
the positionally fixed apparatus compares the measurement data with the route data stored in the positionally fixed apparatus and updates the route data according to a predetermined criterion.

12. The method as claimed in claim 1, wherein the route data describes contours of roadway boundaries and/or obstacles.

13. The method as claimed in claim 1, wherein the transceiver apparatus transmits and receives route data via a Bluetooth interface.

14. The method as claimed in claim 1, wherein before the first motor vehicle acquires route data when traveling on the route, the positionally fixed apparatus transmits route data to the first motor vehicle in a wireless fashion.

15. The method as claimed in claim 14, wherein the positionally fixed apparatus compares the route data transmitted from the first motor vehicle with the route data transmitted to the first motor vehicle from the positionally fixed apparatus.

16. The method as claimed in claim 1, wherein
the positionally fixed apparatus does not update the route data for short term changes,
the permanence of the change is determined by a predetermined number of route data messages containing consistent information, the predetermined number of times being greater than one, and
the positionally fixed apparatus updates the route data after receiving the predetermined number of route data messages containing consistent information.

17. A positionally fixed ground-based device comprising:
a data memory to store route data relating to a route in a vicinity of the positionally fixed ground-based device;
a transceiver apparatus to receive a request from a motor vehicle, to transmit the route data stored in the data memory, in a decentralized wireless fashion to the motor vehicle in response to the request, and to receive update route data from the motor vehicle; and
a data-processing apparatus configured to perform a comparison of the route data stored in the data memory and the update route data received from the motor vehicle, and to modify the route data stored in the data memory based on the comparison, according to a predetermined criterion relating to a permanence of a change in a physical property of the route to which the route data stored in the data memory relates.

18. A method for providing route data to motor vehicles, describing a route for the motor vehicles, comprising:
storing route data in a positionally fixed apparatus which has a transceiver apparatus and a data memory, the positionally fixed apparatus being located in or on the route or an entry road to the route;
acquiring route data when traveling on the route, the route data being acquired by a first motor vehicle;
transmitting the route data from the first motor vehicle to the positionally fixed apparatus;
comparing, at the positionally fixed apparatus, the route data transmitted from the first motor vehicle with the route data stored in the positionally fixed apparatus;
updating the route data stored in the positionally fixed apparatus, according to a predetermined criterion representing a permanence of a change in a physical property of the route described in the route data stored in the positionally fixed apparatus; and
after updating the route data, transmitting the route data to a second motor vehicle in a decentralized wireless fashion from the positionally fixed apparatus.

* * * * *